United States Patent
Yeung et al.

(10) Patent No.: US 7,341,784 B2
(45) Date of Patent: *Mar. 11, 2008

(54) LIGHT MANAGEMENT FILM AND ITS PREPARATION AND USE

(75) Inventors: Chunghei Yeung, Evansville, IN (US); Yu Hu, Evansville, IN (US); Kevin Patrick Capaldo, Mount Vernon, IN (US); Anne Elizabeth Herrmann, Glenview, IL (US); Yan Zhang, Shanghai (CN); Bret Chisholm, Clifton Park, NY (US); Paul Smigelski, Rotterdam, NY (US); Dennis Joseph Coyle, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 327 days.

This patent is subject to a terminal disclaimer.

(21) Appl. No.: 10/937,942

(22) Filed: Sep. 10, 2004

(65) Prior Publication Data

US 2006/0071362 A1    Apr. 6, 2006

(51) Int. Cl.
- B32B 27/28 (2006.01)
- C09K 19/04 (2006.01)
- C08F 2/46 (2006.01)
- C08F 20/22 (2006.01)
- C08K 5/42 (2006.01)

(52) U.S. Cl. ............... 428/423.1; 428/423.3; 428/425.9; 428/1.1; 428/1.6; 522/64; 522/103; 522/182; 522/180; 526/328; 526/329.7; 526/292.3; 524/165; 524/910; 524/911; 524/912

(58) Field of Classification Search ............ 522/182, 522/64, 28; 524/165, 910, 911; 428/212, 428/423.1, 425.9, 1.1, 1.6; 526/328
See application file for complete search history.

(56) References Cited

U.S. PATENT DOCUMENTS

| | | |
|---|---|---|
| 1,591,572 A | 7/1926 | Stimson |
| 1,671,086 A | 5/1928 | Stimson |
| 1,807,350 A | 5/1931 | Stimson |
| 1,906,655 A | 5/1933 | Stimson |
| 3,352,825 A | 11/1967 | Price |

(Continued)

FOREIGN PATENT DOCUMENTS

EP    0 604 130 A2    6/1994

(Continued)

OTHER PUBLICATIONS

International Search Report; International Application No. PCT/US2005/031683; International Filing Date Jan. 9, 2005; Date of Mailing Mar. 2, 2006.

(Continued)

*Primary Examiner*—James J. Seidleck
*Assistant Examiner*—Saira B. Haider
(74) *Attorney, Agent, or Firm*—Cantor Colburn LLP (57) ABSTRACT

A light management film includes a first layer with a thermoplastic resin and a particular phosphonium sulfonate salt, and a second layer formed from a curable composition and having a refractive index of at least 1.5. The light management film exhibits reduced static electricity build-up and reduced dust attraction, making it easier to handle during fabrication of display devices such as the flat panel displays of laptop computers.

32 Claims, 2 Drawing Sheets

U.S. PATENT DOCUMENTS

| | | |
|---|---|---|
| 3,712,706 A | 1/1973 | Stamm |
| 3,924,929 A | 12/1975 | Holmen et al. |
| 4,059,618 A | 11/1977 | Blumenfeld et al. |
| 4,073,568 A | 2/1978 | Heasley |
| 4,198,465 A | 4/1980 | Moore et al. ............... 428/409 |
| 4,208,090 A | 6/1980 | Heenan |
| 4,275,091 A | 6/1981 | Lippits et al. ............. 427/53.1 |
| 4,349,598 A | 9/1982 | White |
| 4,351,920 A | 9/1982 | Ariga et al. ................... 525/67 |
| 4,363,844 A | 12/1982 | Lewis et al. ................... 428/65 |
| 4,519,065 A | 5/1985 | Lewis et al. ................ 369/275 |
| 4,542,449 A | 9/1985 | Whitehead |
| 4,576,850 A | 3/1986 | Martens ..................... 428/156 |
| 4,601,861 A | 7/1986 | Pricone et al. |
| 4,618,518 A | 10/1986 | Pricone et al. |
| 4,703,999 A | 11/1987 | Benson |
| 4,721,377 A | 1/1988 | Fukuda et al. |
| 4,790,893 A | 12/1988 | Watkins ...................... 156/232 |
| 4,791,540 A | 12/1988 | Dreyer, Jr. et al. |
| 4,799,131 A | 1/1989 | Aho et al. |
| 4,801,193 A | 1/1989 | Martin |
| 4,812,032 A | 3/1989 | Fukuda et al. |
| 4,883,341 A | 11/1989 | Whitehead ............. 350/276 R |
| 4,895,428 A | 1/1990 | Nelson et al. |
| 4,943,380 A | 7/1990 | Sugiura et al. ............... 252/8.7 |
| 4,946,531 A | 8/1990 | Crouch et al. ............... 156/242 |
| 4,984,144 A | 1/1991 | Cobb, Jr. et al. ............ 362/339 |
| 5,056,892 A | 10/1991 | Cobb, Jr. ..................... 359/831 |
| 5,161,041 A | 11/1992 | Abileah et al. ................ 359/40 |
| 5,175,030 A | 12/1992 | Lu et al. ....................... 428/30 |
| 5,183,597 A | 2/1993 | Lu .............................. 264/1.4 |
| 5,213,872 A | 5/1993 | Pricone et al. |
| 5,242,630 A | 9/1993 | Nuij et al. .................... 264/1.3 |
| 5,271,968 A | 12/1993 | Coyle et al. ................. 427/558 |
| 5,284,435 A | 2/1994 | Nuij et al. ................... 425/385 |
| 5,424,008 A * | 6/1995 | Hirai et al. ............... 252/501.1 |
| 5,424,339 A | 6/1995 | Zanka et al. ................ 522/168 |
| 5,455,105 A | 10/1995 | Coyle et al. ................. 428/215 |
| 5,466,397 A | 11/1995 | Bales et al. |
| 5,468,542 A | 11/1995 | Crouch ....................... 428/215 |
| 5,518,789 A | 5/1996 | Burns et al. |
| 5,626,800 A | 5/1997 | Williams et al. ........... 264/1.38 |
| 5,635,278 A | 6/1997 | Williams .................... 428/172 |
| 5,771,328 A | 6/1998 | Wortman et al. ........... 385/146 |
| 5,828,488 A | 10/1998 | Ouderkirk et al. .......... 359/487 |
| 5,855,983 A | 1/1999 | Williams .................... 428/172 |
| 5,858,139 A | 1/1999 | Ouderkirk et al. |
| 5,891,931 A | 4/1999 | Leboeuf et al. ............... 522/64 |
| 5,900,287 A | 5/1999 | Williams .................... 427/510 |
| 5,908,874 A | 6/1999 | Fong et al. ................... 522/74 |
| 5,917,664 A | 6/1999 | O'Neill et al. .............. 359/831 |
| 5,919,551 A | 7/1999 | Cobb, Jr. et al. ........... 428/156 |
| 5,932,626 A | 8/1999 | Fong et al. ................. 522/182 |
| 5,981,113 A | 11/1999 | Christian ....................... 430/9 |
| 6,005,137 A | 12/1999 | Moore et al. ............... 560/139 |
| 6,007,888 A | 12/1999 | Kime ........................ 428/64.1 |
| 6,025,897 A | 2/2000 | Weber et al. ................. 349/96 |
| 6,052,164 A | 4/2000 | Cobb, Jr. et al. ............. 349/64 |
| 6,059,003 A | 5/2000 | Wittkopf ..................... 156/555 |
| 6,091,547 A | 7/2000 | Gardiner et al. |
| 6,096,247 A | 8/2000 | Ulsh et al. ................... 264/2.7 |
| 6,107,364 A | 8/2000 | Fong et al. ................. 522/182 |
| 6,111,696 A | 8/2000 | Allen et al. |
| 6,120,636 A | 9/2000 | Nilsen et al. |
| 6,194,497 B1 | 2/2001 | Willems et al. ............. 524/165 |
| 6,261,700 B1 | 7/2001 | Olson et al. ................. 428/522 |
| 6,280,063 B1 | 8/2001 | Fong et al. ................. 362/333 |
| 6,291,070 B1 | 9/2001 | Arpac et al. ................ 428/412 |
| 6,313,187 B2 | 11/2001 | LeBoeuf et al. .............. 522/13 |
| 6,329,485 B1 | 12/2001 | Vanderbilt ............... 526/318.1 |
| 6,375,776 B1 | 4/2002 | Buoni et al. |
| 6,514,594 B1 | 2/2003 | Wei et al. |
| 6,577,446 B2 | 6/2003 | Kumazawa et al. |
| 6,592,988 B1 | 7/2003 | Thompson et al. ......... 428/375 |
| 6,663,978 B1 | 12/2003 | Olson et al. |
| RE38,530 E | 6/2004 | Willems et al. ............. 524/154 |
| 6,833,176 B2 | 12/2004 | Chisholm et al. |
| 6,833,391 B1 | 12/2004 | Chisholm et al. |
| 7,045,558 B2 | 5/2006 | Chisholm et al. |
| 7,087,659 B2 | 8/2006 | Chisholm et al. |
| 2002/0114922 A1 | 8/2002 | Bourne et al. ............. 428/141 |
| 2002/0114923 A1 | 8/2002 | Lilly |
| 2002/0123589 A1 | 9/2002 | Olson et al. |
| 2003/0031844 A1* | 2/2003 | Gorny et al. ............... 428/212 |
| 2003/0099808 A1 | 5/2003 | Coyle et al. ............... 428/64.4 |
| 2003/0108710 A1 | 6/2003 | Coyle et al. ............... 428/64.4 |
| 2003/0127770 A1 | 7/2003 | Xi et al. .................... 264/175 |
| 2003/0162871 A1 | 8/2003 | Saito .......................... 524/148 |
| 2003/0211320 A1 | 11/2003 | Thompson et al. ......... 428/375 |
| 2003/0214728 A1 | 11/2003 | Olczak ...................... 359/707 |
| 2004/0005451 A1 | 1/2004 | Kretman et al. |
| 2004/0066645 A1 | 4/2004 | Graf et al. .................... 362/31 |
| 2004/0109305 A1 | 6/2004 | Chisholm et al. |
| 2004/0109663 A1 | 6/2004 | Olczak ....................... 385/146 |
| 2004/0132858 A1 | 7/2004 | Chisholm et al. |
| 2004/0141103 A1 | 7/2004 | Kotchick et al. |
| 2004/0228141 A1 | 11/2004 | Hay et al. |
| 2004/0242720 A1 | 12/2004 | Chisholm et al. |
| 2005/0259303 A1* | 11/2005 | Settachayanon et al. ...... 359/15 |
| 2005/0275764 A1 | 12/2005 | Ambrose et al. |

FOREIGN PATENT DOCUMENTS

| | | |
|---|---|---|
| EP | 0897950 A2 | 2/1999 |
| WO | WO 98/59265 | 12/1998 |
| WO | WO 00/26274 | 5/2000 |
| WO | WO 00/69945 | 11/2000 |
| WO | WO 01/27527 | 4/2001 |
| WO | WO 01/27663 | 4/2001 |

OTHER PUBLICATIONS

U.S. Appl. No. 11/326,158, filed Jan. 4, 2006, Capaldo, et al, Brightness Enhancement Film, and Methods of Making and Using the Same (available in Image File Wrapper (IFW)).

DATABASE WPI, Section Ch, Week 200236, Derwent Publications Ltd., London, GB; AN 1998-141149, XP 002263499 & JP 03 283761 B (Teijin Kasel Ltd), May 20, 2002 Abstract.

DATABASE WPI, Section Ch, Week 199131, Derwent Publications Ltd., London, GB; AN 1991-225864, XP002263500 & JP 03 143950 A (Nippon GE Plastics), Jun. 19, 1991 Abstract.

DATABASE WPI, Section Ch, Week 199410, Derwent Publications Ltd., London, GB; AN 1994-080118, XP002263501 & JP 06 032973 A (Mitsubishi Gas Chem Co Inc), Feb. 8, 1994 Abstract.

DATABASE WPI, Section Ch, Week 199817, Derwent Publications Ltd., London, GB; AN 1998-189474, XP002263502 & JP 10 046018 A (Idemitsu Petrochem Co Ltd), Feb. 17, 1998 Abstract.

DATABASE WPI, Section Ch, Week 199522, Derwent Publications Ltd., London, GB; AN 1995-167379, XP002263503 & JP 07 090167 A (Teijin Ltd), Apr. 4, 1995 Abstract.

DATABASE WPI, Section Ch, Week 199021, Derwent Publications Ltd., London, GB; AN 1990-159122, XP002263505 & JP 02 099560 A (Teijin Kasei Ltd), Apr. 11, 1990 Abstract.

ASTM D 1003-00 "Standard Test Method for Haze and Luminous Transmittance of Transparent Plastics" pp. 1-6.

JP03153715. Publication Date Jan. 7, 1991 "Optical Methacrylic Resin" (Abstract Only) 2 pages.

ASME B46.1-1995 Surface Texture (Surface Roughness, Waviness, and Lay). An American National Standard. pp. 1-113.

L.L. Beecroft, et al. "High Refractive Index Polymers for Optical Applications". J.M.S.-Pure Appl. Chem., A34(4), pp. 573-586- (1997).

Chunghei, Yeung, et al. U.S. Appl. No. 10/937,942 "Light Management Film and its Preparation and Use". Filed on Sep. 10, 2004. pp. 1-42.

JP05287040. Publication Date: Nov. 2, 1993. Ultraviolet-Curing Resin Composition for Transmission Screen and its cured Product. (Abstract Only).

JP2000009901. Publication Date Jan. 14, 2001. Synthetic Resin Lens. (Abstract Only).

Chisholm, et al. "Metal Oxide Nanoparticles, Methods of Making and Methods of Use". U.S. Appl. No. 10/652,812, filed Aug. 29, 2003. pp. 1-35.

Hay, et al. "Light Manangement Films and Articles thereof" U.S. Appl. No. 10/435,233, filed May 9, 2003. pp. 1-30.

JP4285654. Publication Date: Oct. 9, 1992 "Low-Hygroscopic Methacrylic Resin Composition" (Abstract Only).

Pickett, et al. "High Refractive Index, UV-Curable Monomers and Coating Compositions Prepared Therefrom". U.S. Appl. No. 10/987,364, filed Jul. 21, 2004.

Ambrose, et al. "Optical Film, Light-Diffusing Film, and Methods of Making and Using the Same". U.S. Appl. No. 10/895,787, filed Jul. 20, 2004.

U.S. Appl. No. 10/852916, filed May 25, 2004 Copy Available in the Image File Wrapper.

U.S. Appl. No. 11/609,051, filed Dec. 11, 2006 Copy Available in the Image File Wrapper.

F. Wylin, "Antistatic Additives" in H. Zweifel, Ed., "Plastics Additives Handbook", Hanser Gardner Publications, Cincinnati: 2001, pp. 629-630.

* cited by examiner

FIG. 1

LIGHT MANAGEMENT FILM AND ITS PREPARATION AND USE

BACKGROUND OF THE INVENTION

Light management films are widely used in backlight display devices, such as the flat panel displays of laptop computers. They are used to control the light intensity of the display as a function of viewing angle. Light management films comprising a thermoplastic base layer, such as polycarbonate or polyethylene terephthalate, and a microstructured prismatic layer are known. However, handling of such light management films during device fabrication causes accumulation of static energy, which in turn leads to dust attraction. Dust build-up on the film increases device manufacturing time, decreases device yield, and compromises device appearance. Further, flat panel displays, for example, employ a plurality of films arranged in a manner to obtain the desired brightness and diffusion of the light directed to the viewer. It is noted that as the number of films employed increases, the over thickness of the display increases.

Since a demand exists for increasingly thinner flat panel display devices, what is needed in the art is a multifunctional light management film, as well as a light management films with improved anti-static, anti-dust properties.

BRIEF DESCRIPTION OF THE INVENTION

The above-described and other drawbacks are alleviated by a light management film, comprising:
a first layer comprising
  a thermoplastic resin selected from aromatic polycarbonates, polyetherimides, polyesters, polyphenylene ethers, polyphenylene ether/styrene polymer blends, polyamides, polyketones, acrylonitrile-butadiene-styrenes, and blends thereof, and
  a phosphonium sulfonate salt having the structure wherein each occurrence of X is independently halogen or hydrogen provided that at least one X is halogen; m, p, and q are integers from 0 to 12; n is 0 or 1 with the proviso that when n is 1, p and q are not both 0; $R^1$-$R^3$ are each independently $C_1$-$C_{12}$ hydrocarbyl; $R^4$ is $C_1$-$C_{18}$ hydrocarbyl; and Y is selected from wherein $R^5$ is hydrogen or $C_1$-$C_{12}$ hydrocarbyl; and
a second layer disposed on a face of the first layer; wherein the second layer is the cured product of a curable composition; and wherein the second layer has an index of refraction of at least 1.5.

Other embodiments, including a method of preparing the light management film and a flat panel display comprising the light management film are described in detail below.

BRIEF DESCRIPTION OF THE DRAWINGS

Referring now to the drawings wherein like elements are numbered alike in several FIGURES.

DETAILED DESCRIPTION OF THE INVENTION

The present inventors have conducted extensive research on the methods of reducing the static electricity build-up and dust attraction of light management films. They have surprisingly discovered that incorporation of a particular type of phosphonium sulfonate salt into the thermoplastic first (base) layer dramatically improves the anti-static and anti-dust properties of the film, even though the phosphonium sulfonate salt is not added to the second (cured) layer. Incorporation of the phosphonium sulfonate salt reduces the surface resistivity of the thermoplastic base layer by up to four orders of magnitude or more, and reduces the static decay half-life of the entire light-management film by up to three orders of magnitude or more.

The light management film comprises a first layer that includes a thermoplastic resin. Suitable thermoplastic resins include, for example, aromatic polycarbonates, polyetherimides, polyesters, polyphenylene ethers, polyphenylene ether/styrene polymer blends, polyamides, polyketones, acrylonitrile-butadiene-styrenes, and blends thereof. In one embodiment, the thermoplastic resin comprises an aromatic polycarbonate. The first layer may comprise the thermoplastic resin in an amount of about 50 to about 99.99 weight percent, based on the total composition of the first layer. Within this range, the thermoplastic resin amount may specifically be at least about 90 weight percent, more specifically at least about 95 weight percent, still more specifically at least 98 weight percent.

In addition to the thermoplastic resin, the first layer includes a phosphonium sulfonate salt that contributes antistatic properties. Suitable phosphonium sulfonate salts include those having the structure wherein each occurrence of X is independently halogen or hydrogen provided that at least one X is halogen; m, p, and q are integers from 0 to 12; n is 0 or 1 with the proviso that when n is 1, p and q are not both 0; $R^1$-$R^3$ are each independently $C_1$-$C_{12}$ hydrocarbyl; $R^4$ is $C_1$-$C_{18}$ hydrocarbyl; and Y is selected from -continued wherein R⁵ is hydrogen or $C_1$-$C_{12}$ hydrocarbyl. As used herein, the term "hydrocarbyl", whether used by itself, or as a prefix, suffix, or fragment of another term, refers to a residue that contains only carbon and hydrogen. The residue may be aliphatic or aromatic, straight-chain, cyclic, bicyclic, branched, saturated, or unsaturated. It may also contain combinations of aliphatic, aromatic, straight chain, cyclic, bicyclic, branched, saturated, and unsaturated hydrocarbon moieties. The hydrocarbyl residue, when so stated however, may contain heteroatoms over and above the carbon and hydrogen members of the substituent residue. Thus, when specifically noted as containing such heteroatoms, the hydrocarbyl or hydrocarbylene residue may also contain carbonyl groups, amino groups, hydroxyl groups, or the like, or it may contain heteroatoms within the backbone of the hydrocarbyl residue. As used herein, the term "halogen" includes fluorine, chlorine, bromine, and iodine.

In one embodiment, the phosphonium sulfonate salt has the structure above, wherein n, p, and q are zero, and m is 1 to 12. Thus, the phosphonium sulfonate salt has the structure wherein each occurrence of X is independently halogen or hydrogen provided that at least one X is halogen; m is 1 to 12; $R^1$-$R^3$ are each independently $C_1$-$C_{12}$ hydrocarbyl; and $R^4$ is $C_1$-$C_{18}$ hydrocarbyl.

In one embodiment, the phosphonium sulfonate salt is a fluorinated phosphonium sulfonate salt and is composed of a fluorocarbon containing an organic sulfonate anion and an organic phosphonium cation. Examples of such fluorinated organic sulfonate anions include perfluoro methane sulfonate, perfluoro butane sulfonate, perfluoro hexane sulfonate, perfluoro heptane sulfonate, perfluoro octane sulfonate, and the like. Examples of the aforementioned organic phosphonium cation include aliphatic phosphonium cations such as tetramethyl phosphonium, tetraethyl phosphonium, tetrabutyl phosphonium, triethylmethyl phosphonium, tributylmethyl phosphonium, tributylethyl phosphonium, trioctylmethyl phosphonium, trimethylbutyl phosphonium, trimethyloctyl phosphonium, trimethyllauryl phosphonium, trimethylstearyl phosphonium, triethyloctyl phosphonium; and aromatic phosphonium cations such as tetraphenyl phosphonium, triphenylmethyl phosphonium, triphenylbenzyl phosphonium, tributylbenzyl phosphonium; and the like.

The phosphonium sulfonate salt can be obtained by any combination of any of these organic sulfonate anions and organic cations but is not limited by the examples given above. Fluorinated phosphonium sulfonate salts may be produced in a very pure form by mixing the corresponding sulfonic acid and the quaternary phosphonium hydroxide in a solvent mixture followed by evaporation of the solvent mixture. Tetrabutyl phosphonium perfluoro butane sulfonate, for example, can be produced with a yield of about 95% by placing 98.6 grams (g) of perfluoro butane sulfonic acid, 200 milliliters (mL) of a 40 weight percent solution of tetrabutyl phosphonium hydroxide, and 500 mL of a solvent mixture in a flask, stirring the mixture for one hour at room temperature, isolating phosphonium sulfonate, which separates as an oily layer, washing it with 100 mL of water, and evaporating the solvents using a vacuum pump.

In one embodiment, the phosphonium sulfonate salt comprises tetra-n-butylphosphonium nonafluoro-n-butylsulfonate (tetrabutylphosphonium 1,1,2,2,3,3,4,4,4-nonafluoro-1-butanesulfonate; Chemical Abstracts Service Registry No. 220689-12-3).

The phosphonium sulfonate salt may be used in an amount effective to improve the anti-static properties of the light management film. Such amounts are generally about 0.00001 to about 2 weight percent, based on the total composition of the first layer. Within this range, the phosphonium sulfonate salt amount may specifically be at least 0.001 weight percent, more specifically at least 0.1 weight percent, still more specifically at least 0.2 weight percent. Also within this range, the phosphonium sulfonate salt amount may specifically be up to 1.5 weight percent, more specifically up to 1 weight percent.

In one embodiment, the light management film is substantially free of fluorinated compounds other than fluorinated phosphonium sulfonate salts. It may be desirable to minimize the content of halogenated compounds in order to improve the environmental friendliness of the light management film.

The first layer may generally have a thickness of about 25 to about 300 micrometers. Within this range, the thickness may specifically be at least about 50 micrometers, more specifically at least 100 micrometers. Also within this range, the thickness may specifically be up to about 250 micrometers, more specifically up to 200 micrometers.

In addition to the first layer, the light management film comprises a second layer disposed on a face of the first layer. The second layer has an index of refraction of at least 1.5, more specifically at least about 1.61. The second layer is the cured product of a curable composition. The curable composition generally comprises a polymerizable compound. Polymerizable compounds, as used herein, are monomers or oligomers comprising one or more functional groups capable of undergoing radical, cationic, anionic, thermal, or photochemical polymerization. Suitable functional groups include, for example, acrylate, methacrylate, vinyl, epoxide, and the like.

In one embodiment, the curable composition comprises an alkane diol di(meth)acrylate having 2 to about 12 carbon atoms in the alkane moiety. As used herein, the fragment -(meth)acryl- includes -acryl-, -methacryl-, -thioacryl- ($CH_2$=$CH_2$—C(=O)—S—), and -thiomethacryl- ($CH_2$=$CH(CH_3)$—C(=O)—S—). Suitable alkane diol di(meth)acrylates include, for example, ethylene glycol di(meth)acrylate, 1,4-butane diol di(meth)acrylate, 1,6-hexane diol di(meth)acrylate, 1,8-octane diol diacrylate, 1,10-decane diol diacrylate, and the like, and mixtures thereof. In one embodiment, the alkane diol di(meth)acrylate comprises 1,6-hexane diol di(meth)acrylate.

In one embodiment, the curable composition comprises a multifunctional (meth)acrylate having the structure wherein $R^6$ is hydrogen or methyl; $X^1$ is O, NH, or S; $R^7$ is substituted or unsubstituted $C_1$-$C_{100}$ hydrocarbyl having a valence of r; and r is 2, 3, or 4. The substitution on $R^7$ may include fluorine, chlorine, bromine, iodine, $C_1$-$C_6$ alkyl, $C_1$-$C_3$ perhalogenated alkyl, hydroxy, $C_1$-$C_6$ ketone, $C_1$-$C_6$ ester, N,N-($C_1$-$C_3$) alkyl substituted amide, or the like, or a combination thereof.

In one embodiment, the curable composition comprises a difunctional (meth)acrylate, an arylether (meth)acrylate, and a polymerization initiator.

The difunctional (meth)acrylate may have the structure wherein $R^6$ is hydrogen or methyl; $X^1$ is O, NH, or S; and $R^8$ has the structure wherein Q is —C(CH$_3$)$_2$—, —CH$_2$—, —C(O)—, —S—, —O—, or —S(O); $R^9$ is $C_1$-$C_6$ alkylene or hydroxy-substituted $C_1$-$C_6$ alkylene; each occurrence of t is independently 0, 1, 2, 3, or 4; and d is 1 to 3. Suitable difunctional (meth)acrylates include, for example, 2,2-bis(4-(2-(meth)acryloxyethoxy)phenyl)propane; 2,2-bis((4-(meth)acryloxy)phenyl)propane; (meth)acrylic acid 3-(4-{1-[4-(3-acryloyloxy-2-hydroxy-propoxy)-3,5,-dibromo-phenyl]-1-methyl-ethyl}-2,6-dibromo-phenoxy)-2-hydroxy-propyl ester; (meth)acrylic acid 3-[4-(1-{4-[3-(4-{1-[4-(3-acryloyloxy-2-hydroxy-propoxy)-3,5-dibromo-phenyl]-1-methyl-ethyl}-2,6-dibromo-phenoxy)-2-hydroxy-propoxy]-3,5-dibromo-phenyl}-1-methyl-ethyl)-2,6-dibromo-phenoxy]-2-hydroxy-propyl ester; and the like, and combinations thereof. The difunctional (meth)acrylate may be prepared, for example, by reacting a brominated bisphenol with epichlorohydrin to form an epoxide copolymer, which is then reacted with (meth)acrylic acid to produce the difunctional (meth)acrylate. Difunctional (meth)acrylates are also commercially available as, for example, the multifunctional (meth)acrylate based on the reaction product of tetrabrominated bisphenol-A di-epoxide available as RDX 51027 from UCB Chemicals. Additional commercially available multifunctional epoxides include, for example, EB600, EB3600, EB3700, EB3701, EB3702, and EB3703, all available from UCB Chemicals, as well as CN104 and CN120 available from Sartomer. The difunctional (meth)acrylate may be present in an amount of about 10 to about 90 weight percent based on the total curable composition. Within this range, the difunctional (meth)acrylate amount may specifically be at least about 35 weight percent, more specifically at least about 45 weight percent, even more specifically at least about 50 weight percent. Also within this range, the difunctional (meth)acrylate amount may specifically be up to about 70 weight percent, more specifically up to about 65 weight percent, even more specifically up to about 60 weight percent.

The arylether (meth)acrylate may have the structure wherein $R^6$ is hydrogen or methyl; $X^1$ is O, NH, or S; $X^2$ is O, NH, or S; $R^{10}$ is substituted or unsubstituted divalent $C_1$-$C_{12}$ alkylene or alkenylene; Ar is substituted or unsubstituted $C_6$-$C_{12}$ aryl, including phenyl; wherein the substitution on the $R^{10}$ and Ar may independently include fluorine, chlorine, bromine, iodine, $C_1$-$C_6$ alkyl, $C_1$-$C_3$ perhalogenated alkyl, hydroxy, $C_1$-$C_6$ ketone, $C_1$-$C_6$ ester, N,N-di($C_1$-$C_3$)alkylamide, or a combination comprising at least one of the foregoing substituents. The Ar group, when substituted, may be mono-, di-, tri-, tetra- or penta-substituted. As used herein, "arylether" is inclusive of both arylethers and arylthioethers, also known as arylsulfides. In one embodiment, $X^2$ is S. In one embodiment, the arylether (meth)acrylate comprises 2-phenoxyethyl (meth)acrylate, 2-phenylthioethyl (meth)acrylate, or a combination thereof. Methods of preparing arylether (meth)acrylates are known in the art. For example, the synthesis of 2-phenoxyethyl methacrylate is described in U.S. Pat. No. 5,498,751 to Trapasso et al, and U.S. Pat. No. 6,714,712 to Bishop et al. Arylether methacrylates are also commercially available. For example, phenylthioethyl acrylate is available as BX-PTEA from Bimax Company, and 2-phenoxyethyl acrylate is available as SR339 from Sartomer. The arylether (meth)acrylate is present in an amount of about 15 to about 70 weight percent based on the total curable composition. Within this range, the arylether (meth)acrylate amount may specifically be at least about 20 weight percent, more specifically at least about 30 weight percent. Also within this range, the arylether (meth)acrylate amount may specifically be up to about 60 weight percent, more specifically up to about 50 weight percent, even more specifically up to about 40 weight percent.

Suitable polymerization initiators and amounts are discussed below.

In another embodiment, the curable coating comprises a difunctional (meth)acrylate, an arylether (meth)acrylate, a brominated aromatic (meth)acrylate, and a polymerization initiator. The difunctional (meth)acrylate and the arylether (meth)acrylate are the same as those described above. The brominated aromatic (meth)acrylate may have the structure wherein $R^6$ is hydrogen or methyl; $X^1$ is O, NH, or S; $X^3$ is O, NH, or S; r is 0, 1, 2, or 3, and s is 0 or 1, with the proviso that if r is 0 then s is 0; and u is 3, 4, or 5. Suitable brominated aromatic (meth)acrylates include, for example, 2,4,6-tribromobenzyl (meth)acrylate, tetrabromobenzyl (meth)acrylate, tribromophenyl (meth)acrylate, pentabromophenyl (meth)acrylate, and pentabromobenzyl (meth) acrylate. Methods of preparing brominated aromatic (meth) acrylates are known in the art. For example, preparations of various brominated benzyl (meth)acrylates are described in U.S. Pat. No. 4,059,618 to Blumenfeld et al. Brominated aromatic (meth)acrylates are also commercially available. For example, pentabromobenzyl acrylate is available as FR1025M from Ameribrom. The amounts of the difunctional (meth)acrylate, and the arylether (meth)acrylate may be the same as those discussed above. The amount of the brominated aromatic (meth)acrylate may be about 1 to about 20 weight percent based on the total curable composition. Within this range, the brominated aromatic (meth)acrylate amount may specifically be at least about 3 weight percent, more specifically at least about 4, even more specifically at least about 5 weight percent. Also within this range, the brominated aromatic (meth)acrylate amount may specifically be up to about 15 weight percent, more specifically up to about 10 weight percent, even more specifically up to about 8 weight percent.

In another embodiment, the curable composition comprises a high refractive index monomer having the structure wherein Z is an ethylenically unsaturated group; $X^4$ is O, S, or NH; $L^1$ and $L^2$ are each independently $C_1$-$C_3$ alkylene, —($C_1$-$C_3$ alkylene)—S—($C_1$-$C_3$ alkylene)—, or —($C_1$-$C_3$ alkylene)—O—($C_1$-$C_3$ alkylene)—; $R^{11}$ is hydrogen or $C_1$-$C_6$ alkyl; $R^{12}$ and $R^{13}$ are each independently aryl, including phenyl or naphthyl, aryl($C_1$-$C_6$ alkylene)—, heteroaryl, or heteroaryl($C_1$-$C_6$ alkylene)—, each of which group is substituted with 0 to 5 substituents independently chosen from halogen, $C_1$-$C_4$ alkyl, $C_1$-$C_4$ alkoxy, ($C_1$-$C_4$ alkyl)S—, $C_1$-$C_4$ haloalkyl, and $C_1$-$C_4$ aloalkoxy; and $Y^1$ and $Y^2$ are each independently O, S, NH, or N. In one option of this embodiment, $Y^1$ and $Y^2$ are both S, and i) $X^4$ is S, or ii) at least one of $R^{12}$ and $R^{13}$ is heteroaryl or heteroaryl($C_1$-$C_6$ alkylene) substituted as previously described, or iii) one or both of $L^1$ and $L^2$ are —($C_1$-$C_3$ alkyiene)—S—($C_1$-$C_3$ alkylene)—, or —($C_1$-$C_3$ alkylene)—O—($C_1$-$C_3$ alkylene)—. In another option of this embodiment, $Y^1$ or $Y^2$ is N, and each corresponding combination $R^{12}$—$Y^1$ or $R^{13}$—$Y^2$ is independently an N—containing heteroaryl excluding carbazole. In another option of this embodiment, Z is acryloyl, methacryloyl, vinyl, or allyl; X is O or S; and R is hydrogen. "High refractive index monomer" refers to a monomer that may contribute increased refractive index to cured compositions comprising it. Additional high refractive index monomers and curable compositions comprising them are described in copending U.S. Ser. No. 10/897,364, filed Jul. 21, 2004 and published Mar. 3, 2005 as U.S. Patent Application Publication No. US 2005/0049376 A1.

The curable compositions described above comprise a polymerization initiator to promote polymerization of the curable components. Suitable polymerization initiators include photoinitiators that promote polymerization of the components upon exposure to ultraviolet radiation. Particularly suitable photoinitiators include phosphine oxide photoinitiators. Examples of such photoinitiators include the IRGACURE® and DAROCUR® series of phosphine oxide photoinitiators available from Ciba Specialty Chemicals; the LUCIRIN® series from BASF Corp.; and the ESACURE® series of photoinitiators available from Lamberti. Other useful photoinitiators include ketone-based photoinitiators, such as hydroxyalkyl phenyl ketones and alkoxyalkyl phenyl ketones, and thioalkylphenyl morpholinoalkyl ketones. Also suitable are benzoin ether photoinitiators. Combinations of the foregoing photoinitiators may be used.

The polymerization initiator may include peroxy-based initiators that promote polymerization under thermal activation. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha'-bis(t-butylperoxy-m-isopropyl)benzene, 2,5-dimethyl-2,5-di(t-butylperoxy)hexane, dicumylperoxide, di(t-butylperoxy) isophthalate, t-butylperoxybenzoate, 2,2-bis(t-butylperoxy) butane, 2,2-bis(t-butylperoxy)octane, 2,5-dimethyl-2,5-di (benzoylperoxy)hexane, di(trimethylsilyl)peroxide, trimethylsilylphenyltriphenylsilyl peroxide, and the like, and combinations thereof.

The polymerization initiator may be used in an amount effective to promote curing of the curable composition. For example, the polymerization initiator may be used in an amount of about 0.01 to about 10 weight percent based on the total weight of the composition. Within this range, it may be preferred to use a polymerization initiator amount of at least about 0.1 weight percent, more preferably at least about 0.5 weight percent. Also within this range, it may be preferred to use a polymerization initiator amount of up to about 3 weight percent, more preferably up to about 1 weight percent.

Other suitable curable compositions include those describe in commonly assigned U.S. application Ser. No. 10/336,493, filed Jan. 6, 2003.

The second layer has a refractive index of at least 1.5, more specifically at least 1.61, still more specifically at least 1.63. The refractive index of the second layer may be increased by including in the curable composition metal oxide nanoparticles. Suitable metal oxide nanoparticles and methods for their preparation are described, for example, in U.S. Pat. No. 6,261,700 B1 to Olson et al., U.S. Pat. No. 6,291,070 B1 to Arpac et al., as well as commonly assigned, co-pending U.S. Ser. No. 10/652,812. For example, metal oxide nanoparticles may be prepared by a method comprising: hydrolyzing metal alkoxide with an acidic alcohol solution, wherein the acidic alcohol solution comprises an alkyl alcohol, water, and an acid to form a first sol comprising metal oxide nanoparticles; treating the first sol with an organosilane to form a second sol comprising treated metal oxide nanoparticles; and treating the second sol with an organic base in an amount of about 0.1:1 to about 0.9:1 molar ratio of organic base to acid to form a third sol comprising treated metal oxide nanoparticles. The metal of the metal alkoxide may be, for example, titanium, cerium, zirconium, or tin. The alkoxide of the metal alkoxide may be, for example, a linear or branched $C_1$-$C_{12}$ alkoxide.

The glass transition temperature of the cured resin obtaining on curing the curable composition may be at least about 35° C., specifically at least about 40° C. The cured resin also may have one or more of the following properties: a tensile strength of about 70 to about 700 kilograms per square-centimeter (kg/cm$^2$); a modulus of elasticity of about 140 to about 14,000 kg/cm$^2$; an elongation to break of about 5 to about 300 percent; a transmittance of at least about 91%; a haze value less than about 5%; and a birefringence of less than or equal to about 0.002. Both transmittance and haze may be measured on a hazemeter on samples having cured coating thicknesses of about 10 to about 30 micrometers.

The curable composition may, optionally, further comprise an additive selected from flame retardants, antioxidants, thermal stabilizers, ultraviolet stabilizers, dyes, colorants, anti-static agents, surfactant, and the like, and combinations thereof, so long as they do not deleteriously affect the polymerization of the composition or the properties of the second layer.

The second layer may have a thickness of at about 10 to about 100 micrometers. Within this range, the second layer thickness may specifically be at least about 20 micrometers, more specifically at least about 35 micrometers. Also within this range, the second layer thickness may specifically be up to about 80 micrometers, more specifically up to about 60 micrometers.

For protection and convenience of handling in between preparation of the light management layer and its incorporation into a device, the light management layer may comprise one or more masking layers in addition to the first layer and the second layer. For example, the light management layer may comprise a masking layer disposed on a surface of the first layer opposite the second layer, and/or a masking layer disposed on a surface of the second layer opposite the first layer. Suitable masking layers include single or coextruded layers of polyethylene, polypropylene, polyester or combinations thereof where the adhesion to the first or second layer is controlled either by pressure sensitive adhesive or static.

One embodiment is a light management film, comprising:
 a first layer comprising
  an aromatic polycarbonate, and
  a phosphonium sulfonate salt having the structure wherein each occurrence of X is independently halogen or hydrogen provided that at least one X is halogen; $R^1$-$R^3$ are each independently $C_1$-$C_{12}$ hydrocarbyl; and $R^4$ is $C_1$-$C_{18}$ hydrocarbyl; and
 a second layer disposed on a face of the first layer; wherein the second layer has an index of refraction of at least 1.5; and wherein the second layer is the cured product of a curable composition comprising a multifunctional (meth)acrylate having the structure wherein $R^6$ is hydrogen or methyl; $X^1$ is O, NH, or S; $R^7$ is substituted or unsubstituted $C_1$-$C_{100}$ hydrocarbyl having a valence of r; and r is 2, 3, or 4.

Another embodiment is a light management film, comprising:
 a first layer comprising
  an aromatic polycarbonate, and
  tetra-n-butylphosphonium nonafluoro-n-butylsulfonate; and
 a second layer disposed on a face of the first layer; wherein the second layer has an index of refraction of at least 1.61; and wherein the second layer is the cured product of a curable composition comprising
  a difunctional (meth)acrylate having the structure wherein $R^6$ is hydrogen or methyl; $X^1$ is O, NH, or S; and $R^8$ has the structure wherein Q is —C(CH$_3$)$_2$—, —CH$_2$—, —O—, —S—, C(O)—, —S(O)—, or —S(O)$_2$—; $R^9$ is $C_1$-$C_6$ alkylene or hydroxy-substituted $C_1$-$C_6$ alkylene; each occurrence of t is independently 0, 1, 2, 3, or 4; and d is 1 to 3;
  an arylether (meth)acrylate having the structure wherein $R^6$ is hydrogen or methyl; $X^1$ is O, NH, or S; $X^2$ is O, NH, or S; $R^{10}$ is substituted or unsubstituted divalent $C_1$-$C_{12}$ alkylene or alkenylene; Ar is substituted or unsubstituted $C_6$-$C_{12}$ aryl, including phenyl; wherein the substitution on the $R^{10}$ and Ar may independently include fluorine, chlorine, bromine, iodine, $C_1$-$C_6$ alkyl, $C_1$-$C_3$ perhalogenated alkyl, hydroxy, $C_1$-$C_6$ ketone, $C_1$-$C_6$ ester, N,N-di($C_1$-$C_3$) alkylamide, or a combination comprising at least one of the foregoing substituents; and
 a polymerization initiator.

In one embodiment, the second layer bears a microstructured pattern on the surface opposite the first layer. More particularly, the first layer (base film) comprises a first surface (i.e., the surface of the first layer that faces toward a LCD when employed in a flat panel display, more particularly the surface of the first layer that faces toward the user of the device) and a second surface (i.e., the surface that faces toward the light guide, more particularly the surface that faces away from the user of the device), wherein the second layer is disposed in physical communication with the first surface of the first layer.

In an embodiment, the first layer comprises a second surface, which can comprise a polished surface or a textured surface (e.g., a matte surface, velvet surface, and the like). It is noted that when a textured second surface is employed in a laptop computer, the overall thickness of the films employed can advantageously be decreased by at least the thickness of a light diffusing film. More particularly, the overall thickness can be decreased by greater than or equal to about 50 micrometers, more specifically greater than or equal to about 100 micrometers.

The terms "polish", "matte", and "velvet" are all terms readily understood by those skilled in the art. For example, a polish surface can comprise a surface roughness (Ra) of less than 0.3 micrometers; a matte (e.g., fine matte, medium matte, course matte, and the like) surface can comprise a surface roughness (Ra) of 0.3 micrometers to 2.2 micrometers; and a velvet surface can comprise a surface roughness (Ra) greater than 2.2 micrometers. It is noted that the term surface roughness (Ra) is a term readily understood by those skilled in the art. Generally, the Ra is a measure of the average roughness of the film. It can be determined by integrating the absolute value of the difference between the surface height and the average height and dividing by the measurement length for a one dimensional surface profile, or the measurement area for a two dimensional surface profile. More particularly, surface roughness can be measured using a Serfcorder SE4000K, commercially available from Kosaka Laboratory Ltd., wherein the surface roughness is measured according to ASME B46.1-1995.

Further, the first layer of the light management film can comprise a haze value sufficient to eliminate at least one light-diffusing film (e.g., a bottom light diffusing film) in a display device. In other words, the light management film can be a multifunctional film, acting to direct light along a viewing axis (i.e., an axis normal (perpendicular) to the display), and as a light diffusing film. The terms "top" and "bottom" used herein with regards to light-diffusing films, as well as any other film employed in a display device, e.g., a backlight display device, are readily understood by those skilled in the art. The term "top" generally refers to a side of a film or the film itself that is closest to the LCD (i.e., the side or the film itself that is closest to and/or faces toward the viewer). Conversely, the term "bottom" generally refers to a side of a film or the film itself that is farthest away from the LCD (i.e., the side of the film itself that is farthest away from and/or faces away from the viewer). For example, the first layer can comprise a haze value of about 20% to about 80%.

It is noted that the percent haze can be predicted and calculated from the following equation:

$$\% \text{ Haze} = 100 \times \frac{\text{Total Diffuse Transmission}}{\text{Total Transmission}} \quad (1)$$

wherein total transmission is the integrated transmission; and the total diffuse transmission is the light transmission that is scattered by the film as defined by ASTM D1003.

One embodiment of a method of preparing a light management film, comprises:

coating a curable composition on a surface of a substrate; wherein the substrate comprises a thermoplastic resin selected from aromatic polycarbonates, polyetherimides, polyesters, polyphenylene ethers, polyphenylene ether/styrene polymer blends, polyamides, polyketones, acrylonitrile-butadiene-styrenes, and blends thereof; and a phosphonium sulfonate salt having the structure wherein each occurrence of X is independently halogen or hydrogen provided that at least one X is halogen; m, p, and q are integers from 0 to 12; n is 0 or 1 with the proviso that when n is 1, p and q are not both 0; $R^1_4$-$R^3$ are each independently $C_1$-$C_{12}$ hydrocarbyl; $R^4$ is $C_1$-$C_{18}$ hydrocarbyl; and Y is selected from wherein $R^5$ is hydrogen or $C_1$-$C_{12}$ hydrocarbyl;

passing the coated substrate through a compression nip defined by a nip roll and a casting drum having a microstructured pattern master; and curing the curable composition while the curable composition is in contact with the microstructured pattern master.

Methods of coating a curable composition on a surface of a substrate are described, for example, in U.S. Pat. No. 5,175,030 to Lu et al., U.S. Pat. No. 5,183,597 to Lu, U.S. Pat. No. 5,271,968 to Coyle et al., U.S. Pat. No. 5,468,542 to Crouch, U.S. Pat. No. 5,626,800 to Williams et al., and U.S. Pat. No. 6,280,063 to Fong et al., as well as U.S. Patent Application Publication No. 2003/0108710 A1 to Coyle et al.

Methods of creating microstructured surfaces include, for example, U.S. Pat. No. 5,175,030 to Lu et al., U.S. Pat. No. 5,183,597 to Lu, U.S. Pat. No. 5,468,542 to Crouch, U.S. Pat. No. 5,626,800 to Williams et al., U.S. Pat. No. 5,917,664 to O'Neill et al., U.S. Pat. No. 5,919,551 to Cobb, Jr. et al., and U.S. Pat. No. 6,280,063 to Fong et al., as well as U.S. Patent Application Publication No. 2003/0108710 A1 to Coyle et al.

One embodiment is a light management film including any of the above first layer compositions and second layer compositions, and prepared by any of the above methods.

Another embodiment is a flat patent display comprising the light management layer. The light management film is useful as a component of a flat panel display or a back-light display, as well as in projection displays, traffic signals, and illuminated signs. Displays incorporating light management films are described, for example, in U.S. Pat. No. 5,161,041 to Abileah et al. and U.S. Pat. No. 6,052,164 to Cobb, Jr. et al., and U.S. Patent Application Publication No. 2003/0214728 A1 to Olczak et al.

Figure 1:
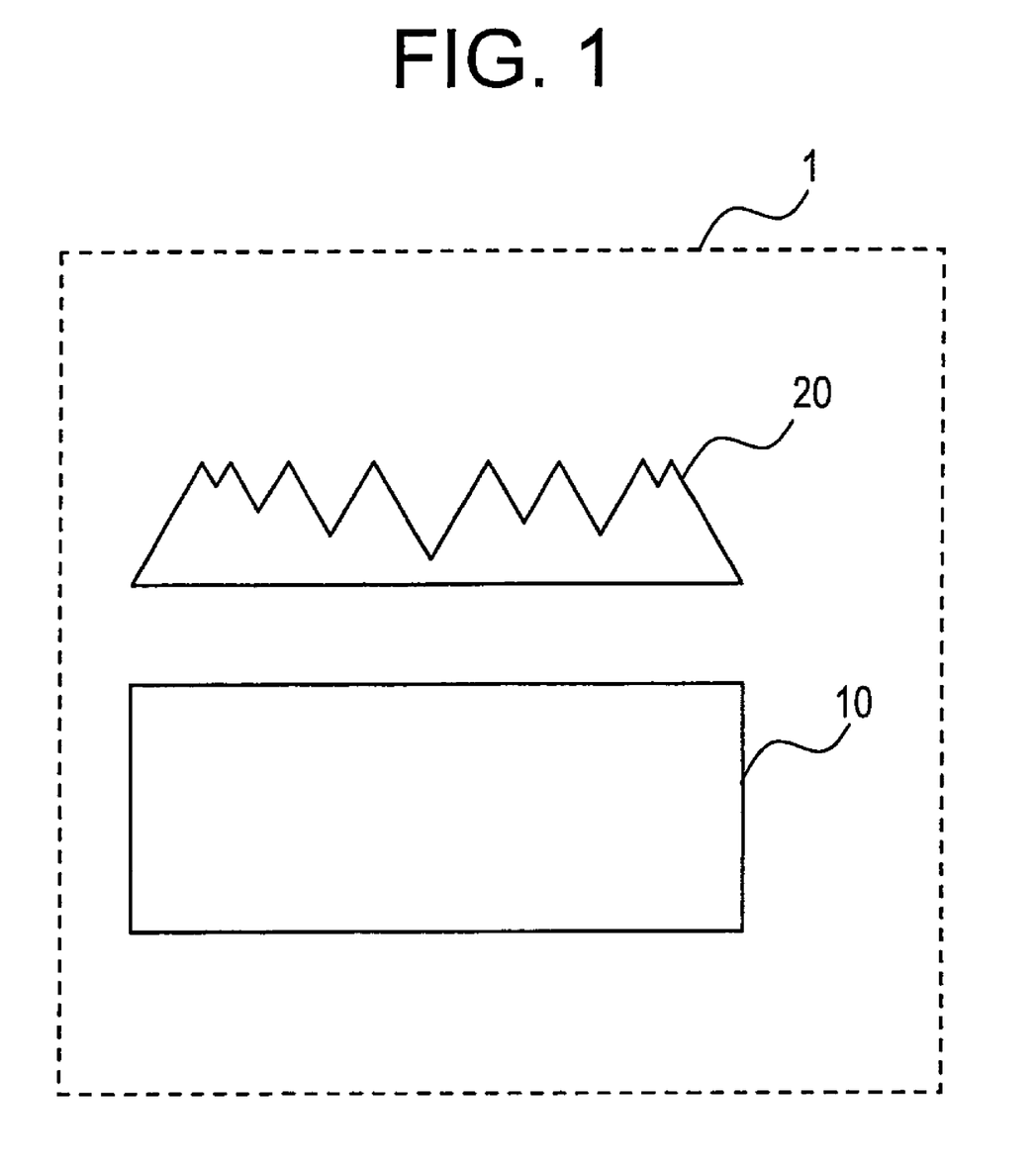
FIG. 1 is a schematic cross-sectional view of a segment of a light management film 1 comprising a first layer 10 and a second layer 20.

FIG. 1 is a schematic cross-sectional view of a segment of a light management film 1. The light management film comprising a first layer 10 and a second layer 20, which is pictured as microstructured.

Figure 2:
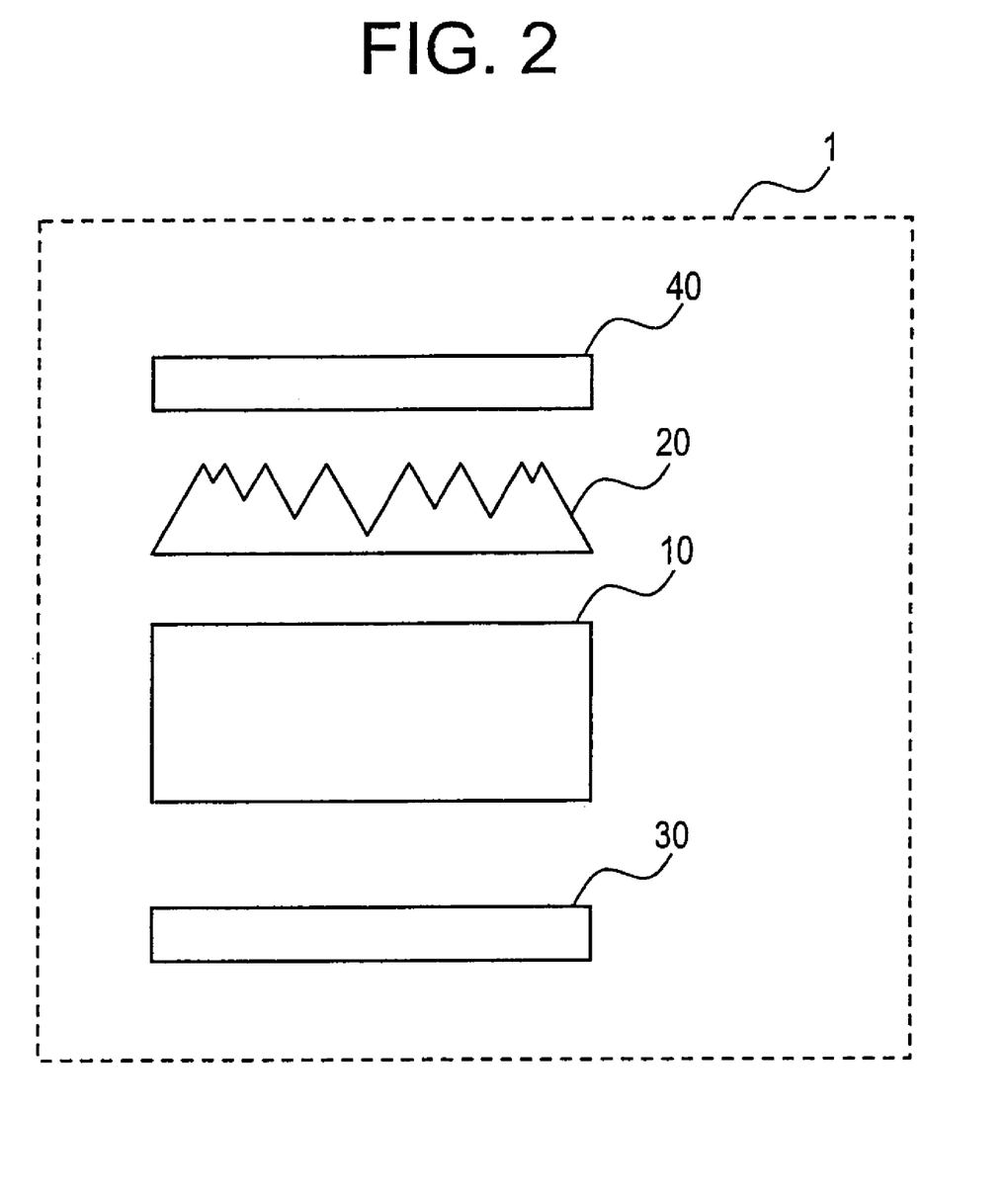
FIG. 2 is a schematic cross-sectional view of a segment of a light management film 1 comprising a first layer 10, a second layer 20, a first masking layer 30, and a second masking layer 40.

FIG. 2 is a schematic cross-sectional view of a segment of a light management film 1 comprising a first layer 10, a second layer 20, pictured as microstructured, a first masking layer 30, and a second masking layer 40. Each masking layer contacts the remainder of the light management layer via an adhesive face.

All ranges disclosed herein are inclusive of the endpoints, and the endpoints are combinable with each other.

The invention is further illustrated by the following non-limiting examples.

EXAMPLES 1-26, COMPARATIVE EXAMPLES 1 AND 2

These examples describe the preparation and resistivity testing of uncoated polycarbonate films containing varying amounts of fluorinated phosphonium sulfonate salt. It further includes static decay testing of uncoated and coated films. Polycarbonate resins containing tetrabutylphosphonium perfluorobutylsulfonate ("FC-1") in the amounts specified in Tables 1 and 2, below, were extruded at 270° C. into base films having a thickness of about 175 micrometers. The film was extruded between a polished chrome calendering roll maintained at 127° C. and a steel calendering roll coated with ⅜ to ½ inch thick, 70 durometer silicone rubber cooled with at 43° C. water circulating inside the roll.

Surface resistivity was measured at 23° C. and 50% relative humidity using a Keithley model 6517A Electrometer and Keithley model 8009 resistivity test fixture. The electrodes were stainless steel covered by conductive rubber having dimensions of 50.8 millimeters outer diameter for the center electrode and 85.7 millimeters outer diameter for top electrode. Resistances used to calculate resistivities were measured at 100 volts for 10 minutes. The sample size was 10 centimeters square. Samples were preconditioned for 48 hours at 23° C. and 50% relative humidity before measurements were conducted, and reported results are the average of three samples per resin composition.

Static decay measurements were conducted on both uncoated and coated films. Coated films were prepared as follows. During extrusion, the bottom masking layer, obtained as Tru-Cling from Tredegar, was applied to the polycarbonate base film described above. The curable coating composition contained about 60% of a brominated difunctional acrylate, about 40% phenylthioethyl acrylate, and a trace amount of photoinitiator. The brominated difunctional acrylate was tetrabromobisphenol A diglycidyl ether diacrylate, having the structure below, obtained from UCB Chemicals. The coating composition was applied to the bottom-masked base film by gravure roll at a thickness of about 40 micrometers. Surface structures were impressed in the coating using a molding tool according to procedures described in U.S. Patent Application Publication No. 2003/0108710 to Coyle et al. The surface structures had random patterns, with unsymmetrical tips and grooves, and nonuniform size, shape, orientation, and distance between grooves. The coating was cured with UV light while in contact with the tool. A top mask, obtained as Hitachi 7325, was applied. Before static decay measurements, all films were preconditioned for 24 hours at 23° C. and 50% relative humidity. To measure static decay time on coated samples, samples measuring 3 inches by 8 inches (7.62 centimeters by 20.32 centimeters) were cut from the films, both masking layers were quickly (within about 1 second) peeled off to expose the base film and coated layer, the sample was mounted in a static meter fixture to provide for measurement of the static charge at the center of the coated side, the initial static charge was measured, and the time required for the static charge to decrease to half its initial value (the "static decay half-life") was recorded. For uncoated films, masking was removed and −10 kilovolts (kV) static was applied to film surface prior to testing. Time required for static to decrease to −5 kV was recorded as the static decay half-life.

Surface resistivity and static decay results for uncoated films are presented in Table 1. Static decay results for coated films are presented in Table 2. The results show that surface resistivity and static decay half-life decrease roughly in proportion to the amount of fluorinated phosphonium sulfonate salt incorporated into the base resin. Many of the films exhibited decay half-lives in the desirable range of about 1 to about 100 seconds, and surface resistivities in the desirable range of about $10^{11}$ to about $10^{14}$ ohm/m². It was surprising that the coated sides of the films exhibited desirable antistatic characteristics even though the antistatic agent was incorporated only in the base film (not the coated layer).

TABLE 1

| | measured [FC-1] (wt %) | surface resistivity (ohm/m²) | static decay half-life (sec) |
|---|---|---|---|
| C. Ex. 1 | 0.000 | $1.56 \times 10^{+17}$ | >2000 |
| Ex. 1 | 0.220 | $3.35 \times 10^{+17}$ | — |
| Ex. 2 | 0.478 | $1.00 \times 10^{+15}$ | 189 |
| Ex. 3 | 0.570 | $1.10 \times 10^{+14}$ | 125 |
| Ex. 4 | 0.630 | $4.64 \times 10^{+13}$ | 55 |
| Ex. 5 | 0.640 | $5.55 \times 10^{+13}$ | 115 |
| Ex. 6 | 0.640 | $2.36 \times 10^{+13}$ | 30 |
| Ex. 7 | 0.650 | $2.79 \times 10^{+13}$ | 39 |
| Ex. 8 | 0.677 | $5.33 \times 10^{+14}$ | 135 |
| Ex. 9 | 0.680 | $1.20 \times 10^{+14}$ | — |
| Ex. 10 | 0.710 | $2.45 \times 10^{+14}$ | 110 |
| Ex. 11 | 0.710 | $1.01 \times 10^{+14}$ | 374 |

TABLE 1-continued

| | measured [FC-1] (wt %) | surface resistivity (ohm/m²) | static decay half-life (sec) |
|---|---|---|---|
| Ex. 12 | 0.720 | $1.18 \times 10^{+14}$ | — |
| Ex. 13 | 0.750 | $2.83 \times 10^{+13}$ | — |

TABLE 1-continued

| | measured [FC-1] (wt %) | surface resistivity (ohm/m$^2$) | static decay half-life (sec) |
|---|---|---|---|
| Ex. 14 | 0.780 | 2.87 × 10$^{+13}$ | 47 |
| Ex. 15 | 0.790 | 1.33 × 10$^{+13}$ | 16 |
| Ex. 16 | 0.850 | 1.50 × 10$^{+13}$ | 25 |
| Ex. 17 | 0.850 | 7.89 × 10$^{+12}$ | 22 |
| Ex. 18 | 0.870 | 2.58 × 10$^{+13}$ | 20 |
| Ex. 19 | 0.920 | 7.54 × 10$^{+12}$ | 19 |
| Ex. 20 | 0.983 | 9.08 × 10$^{+13}$ | 67 |
| Ex. 21 | 0.990 | 9.52 × 10$^{+12}$ | 22 |
| Ex. 22 | 1.462 | 3.70 × 10$^{+12}$ | 4 |

TABLE 2

| | measured [FC-1] (wt %) | static decay half-life (sec) |
|---|---|---|
| C. Ex. 2 | 0.00 | >2000 |
| Ex. 23 | 0.30 | 1000 |
| Ex. 24 | 0.60 | 120 |
| Ex. 25 | 0.80 | 20 |
| Ex. 26 | 1.10 | 12 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another.

All cited patents, patent applications, and other references are incorporated herein by reference in their entirety.

The invention claimed is:

1. A light management film, comprising:
a first layer comprising
a thermoplastic resin selected from aromatic polycarbonates, polyetherimides, polyesters, polyphenylene ethers, polyphenylene ether/styrene polymer blends, polyamides, polyketones, acrylonitrile-butadiene-styrenes, and blends thereof, and
a phosphonium sulfonate salt having the structure wherein each occurrence of X is independently halogen or hydrogen provided that at least one X is halogen; m, p, and q are integers from 0 to 12; n is 0 or 1 with the proviso that when n is 1, p and q are not both 0; $R^1$-$R^3$ are each independently $C_1$-$C_{12}$ hydrocarbyl; $R^4$ is $C_1$-$C_{18}$ hydrocarbyl; and Y is selected from wherein $R^5$ is hydrogen or $C_1$-$C_{12}$ hydrocarbyl; and a second layer disposed on a face of the first layer; wherein the second layer is the cured product of a curable composition; wherein the second layer has an index of refraction of at least 1.5; and wherein the curable composition comprises a difunctional (meth)acrylate having the structure wherein $R^6$ is hydrogen or methyl; $X^1$ is O, NH, or S; and $R^8$ has the structure wherein Q is —C(CH$_3$)$_2$—, —CH$_2$—, —O—, —S—, —C(O)—, —S(O)—, or —S(O)$_2$—; $R^9$ is hydroxy-substituted $C_1$-$C_6$ alkylene; each occurrence of t is independently 0, 1, 2, 3, or 4; and d is 1 to 3;

an arylether (meth)acrylate having the structure wherein $R^6$ is hydrogen or methyl; $X^1$ is O, NH, or S; $X^2$ is O, NH, or S; $R^{10}$ is substituted or unsubstituted divalent $C_1$-$C_{12}$ alkylene or alkenylene; Ar is substituted or unsubstituted $C_6$-$C_{12}$ aryl, including phenyl; wherein the substitution on the $R^{10}$ and Ar may independently include fluorine, chlorine, bromine, iodine, $C_1$-$C_6$ alkyl, $C_1$-$C_3$ perhalogenated alkyl, hydroxy, $C_1$-$C_6$ ketone, $C_1$-$C_6$ ester, N,N-di($C_1$-$C_3$) alkylamide, or a combination comprising at least one of the foregoing substituents; and a polymerization initiator.

2. The light management film of claim 1, wherein the thermoplastic comprises an aromatic polycarbonate.

3. The light management film of claim 1, wherein n, p, and q are zero, and m is 1 to 12.

4. The light management film of claim 1, wherein the phosphonium sulfonate salt comprises tetra-n-butylphosphonium nonafluoro-n-butylsulfonate.

5. The light management film of claim 1, wherein the curable composition further comprises metal oxide nanoparticles.

6. The light management film of claim 1, further comprising a masking layer disposed on a surface of the first layer opposite the second layer.

7. The light management film of claim 1, further comprising a masking layer disposed on a surface of the second layer opposite the first layer.

8. A flat panel display comprising the light management film of claim 1.

9. A light management film, comprising:

a first layer comprising a thermoplastic resin selected from aromatic polycarbonates, polyetherimides, polyesters, polyphenylene ethers, polyphenylene ether/styrene polymer blends, polyamides, polyketones, acrylonitrile-butadiene-styrenes, and blends thereof, and a phosphonium sulfonate salt having the structure wherein each occurrence of X is independently halogen or hydrogen provided that at least one X is halogen; m, p, and q are integers from 0 to 12; n is 0 or 1 with the proviso that when n is 1, p and q are not both 0; $R^1$-$R^3$ are each independently $C_1$-$C_{12}$ hydrocarbyl; $R^4$ is $C_1$-$C_{18}$ hydrocarbyl; and Y is selected from wherein $R_5$ is hydrogen or $C_1$-$C_{12}$ hydrocarbyl; and a second layer disposed on a face of the first layer; wherein the second layer is the cured product of a curable composition: wherein the second layer has an index of refraction of at least 1.5; and wherein the curable composition comprises a difunctional (meth)acrylate having the structure wherein $R^6$ is hydrogen or methyl; $X^1$ is O, NH, or S; and $R^8$ has the structure wherein Q is —C(CH$_3$)$_2$—, —CH$_2$—, —O—, —S—, —C(O)—, —S(O)—, or —S(O)$_2$—; $R^9$ is $C_1$-$C_6$ alkylene or hydroxy-substituted $C_1$-$C_6$ alkylene; each occurrence of t is independently 1, 2, 3, or 4; and d is 1 to 3;

an arylether (meth)acrylate having the structure wherein $R^6$ is hydrogen or methyl; $X^1$ is O, NH, or S; $X^2$ is O, NH, or S; $R^{10}$ is substituted or unsubstituted divalent $C_1$-$C_{12}$ alkylene or alkenylene; Ar is substituted or unsubstituted $C_6$-$C_{12}$ aryl, including phenyl; wherein the substitution on the $R^{10}$ and Ar may independently include fluorine, chlorine, bromine, iodine, $C_1$-$C_6$ alkyl, $C_1$-$C_3$ perhalogenated alkyl, hydroxy, $C_1$-$C_6$ ketone, $C_1$-$C_6$ ester, N,N-di($C_1$-$C_3$) alkylamide, or a combination comprising, at least one of the foregoing substituents; and a polymerization initiator.

10. The light management film of claim 9, wherein the thermoplastic comprises an aromatic polycarbonate.

11. The light management film of claim 9, wherein n, p, and q are zero, and m is 1 to 12.

12. The light management film of claim 9, wherein the phosphonium sulfonate salt comprises tetra-n-butylphosphonium nonafluoro-n-butylsulfonate.

13. The light management film of claim 9, wherein the curable composition further comprises metal oxide nanoparticles.

14. The light management film of claim 9, further comprising a masking layer disposed on a surface of the first layer opposite the second layer.

15. The light management film of claim 9, further comprising a masking layer disposed on a surface of the second layer opposite the first layer.

16. A flat panel display comprising the light management film of claim 9.

17. A light management film, comprising:

a first layer comprising a thermoplastic resin selected from aromatic polycarbonates, polyetherimides, polyesters, polyphenylene ethers, polyphenylene ether/styrene polymer blends, polyamides, polyketones, acrylonitrile-butadiene-styrenes, and blends thereof, and a phosphonium sulfonate salt having the structure wherein each occurrence of X is independently halogen or hydrogen provided that at least one X is halogen; m, p, and q are integers from 0 to 12; n is 0 or 1 with the proviso that when n is 1, p and q are not both 0; $R^1$-$R^3$ are each independently $C_1$-$C_{12}$ hydrocarbyl; $R^4$ is $C_1$-$C_{18}$ hydrocarbyl; and Y is selected from wherein $R^5$ is hydrogen or $C_1$-$C_{12}$ hydrocarbyl; and
a second layer disposed on a face of the first layer; wherein the second layer is the cured product of a curable composition; wherein the second layer has an index of refraction of at least 1.5; and wherein the curable composition comprises tetrabromobisphenol A diglycidyl ether diacrylate.

18. The light management film of claim 17, wherein the thermoplastic comprises an aromatic polycarbonate.

19. The light management film of claim 17, wherein n, p, and q are zero, and m is 1 to 12.

20. The light management film of claim 17, wherein the phosphonium sulfonate salt comprises tetra-n-butylphosphonium nonafluoro-n-butylsulfonate.

21. The light management film of claim 17, wherein the curable composition further comprises metal oxide nanoparticles.

22. The light management film of claim 17, further comprising a masking layer disposed on a surface of the first layer opposite the second layer.

23. The light management film of claim 17, further comprising a masking layer disposed on a surface of the second layer opposite the first layer.

24. A flat panel display comprising the light management film of claim 17.

25. A light management film, comprising:
a first layer comprising
 a thermoplastic resin selected from aromatic polycarbonates, polyetherimides, polyesters, polyphenylene ethers, polyphenylene ether/styrene polymer blends, polyamides, polyketones, acrylonitrile-butadiene-styrenes, and blends thereof, and
a phosphonium sulfonate salt having the structure wherein each occurrence of X is independently halogen or hydrogen provided that at least one X is halogen; m, p, and q are integers from 0 to 12; n is 0 or 1 with the proviso that when n is 1, p and q are not both 0; $R^1$-$R^3$ are each independently $C_1$-$C_{12}$ hydrocarbyl; $R^4$ is $C_1$-$C_{18}$ hydrocarbyl; and Y is selected from wherein $R^5$ is hydrogen or $C_1$-$C_{12}$ hydrocarbyl; and
a second layer disposed on a face of the first layer; wherein the second layer is the cured product of a curable composition; wherein the second layer has an index of refraction of at least 1.5; and wherein the curable composition comprises tetrabromobisphenol A diglycidyl ether diacrylate and phenylthioethyl acrylate.

26. The light management film of claim 25, wherein the thermoplastic comprises an aromatic polycarbonate.

27. The light management film of claim 25, wherein n, p, and q are zero, and m is 1 to 12.

28. The light management film of claim 25, wherein the phosphonium sulfonate salt comprises tetra-n-butylphosphonium nonafluoro-n-butylsulfonate.

29. The light management film of claim 25, wherein the curable composition further comprises metal oxide nanoparticles.

30. The light management film of claim 25, further comprising a masking layer disposed on a surface of the first layer opposite the second layer.

31. The light management film of claim 25, further comprising a masking layer disposed on a surface of the second layer opposite the first layer.

32. A flat panel display comprising the light management film of claim 25.

* * * * *